United States Patent
Yoshimura et al.

(10) Patent No.: US 8,306,400 B2
(45) Date of Patent: Nov. 6, 2012

(54) INFORMATION PROCESSING APPARATUS, INFORMATION PROCESSING METHOD AND COMPUTER PROGRAM

(75) Inventors: Shunji Yoshimura, Tokyo (JP); Hideaki Miyahara, Saitama (JP)

(73) Assignee: Sony Corporation (JP)

( * ) Notice: Subject to any disclaimer, the term of this patent is extended or adjusted under 35 U.S.C. 154(b) by 674 days.

(21) Appl. No.: 12/456,972

(22) Filed: Jun. 25, 2009

(65) Prior Publication Data

US 2010/0008637 A1  Jan. 14, 2010

(30) Foreign Application Priority Data

Jun. 26, 2008 (JP) ................. P2008-167491

(51) Int. Cl.
  *H04N 5/76* (2006.01)
(52) U.S. Cl. ...................... 386/296; 386/297
(58) Field of Classification Search .......... None
  See application file for complete search history.

(56) References Cited

U.S. PATENT DOCUMENTS

| | | | | |
|---|---|---|---|---|
| 6,310,839 | B1 * | 10/2001 | Lee et al. | 369/30.07 |
| 6,973,256 | B1 * | 12/2005 | Dagtas | 386/241 |
| 8,086,093 | B2 * | 12/2011 | Stuckman | 386/296 |
| 2002/0176689 | A1 * | 11/2002 | Heo et al. | 386/46 |

FOREIGN PATENT DOCUMENTS

| | | |
|---|---|---|
| JP | 2000175141 A | 6/2000 |
| JP | 2002354391 | 12/2002 |
| JP | 2004-048718 A | 2/2004 |
| JP | 2004-072396 A | 3/2004 |
| JP | 2005080247 A | 3/2005 |
| JP | 2005348071 A | 12/2005 |
| JP | 2005354530 A | 12/2005 |
| JP | 2006048202 A | 2/2006 |

OTHER PUBLICATIONS

Office Action from Japanese Application No. 2008-167491, dated Feb. 22, 2011.
Office Action from Japanese Application No. 2008-167491, dated Aug. 17, 2010.

* cited by examiner

*Primary Examiner* — Huy T Nguyen
(74) *Attorney, Agent, or Firm* — Lerner, David, Littenberg, Krumholz & Mentlik, LLP

(57) ABSTRACT

An information processing apparatus in the present invention includes a receiving part that receives contents, an input part into which designation information to select desired contents is input from a user, a recording setting information generation part that generates recording setting information of contents to be recorded based on the designation information, an analysis part that analyzes relevance of content of the contents being recorded to be recorded based on the recording setting information to the designation information, and an acquisition part that acquires the desired contents of the user from the recorded contents based on an analysis result by the analysis part.

13 Claims, 10 Drawing Sheets

FIG.4

| MAJOR CLASS 161 | MINOR CLASS 162 |
|---|---|
| NEWS / REPORTS | (NOT SPECIFIED) |
| | SCHEDULED NEWS / GENERAL |
| | WEATHER |
| | FEATURE PROGRAM / DOCUMENTARY |
| | POLITICS / PARLIAMENT |
| | ECONOMICS / MARKETS |
| | OVERSEAS / INTERNATIONAL NEWS |
| | NEWS COMMENTARY |
| | DISCUSSION / TALKS |
| | SPECIAL REPORTING PROGRAM |
| | LOCAL / REGIONAL |
| | TRAFFIC |
| | OTHERS |
| SPORTS | (NOT SPECIFIED) |
| | SPORTS NEWS |
| | BASEBALL |
| | SOCCER |
| | GOLF |
| | OTHER BALL GAMES |
| | SUMO / COMBAT SPORTS |
| | OLYMPICS / INTERNATIONAL ATHLETICS MEETING |
| | MARATHON / TRACK AND FIELD EVENTS / SWIMMING |
| | MOTOR SPORTS |
| | MARINE / WINTER SPORTS |
| | HORSE RACING / MUNICIPALLY OPERATED RACES |
| | OTHERS |
| INFORMATION / TV VARIETY SHOW | (NOT SPECIFIED) |
| | SHOW BUSINESS / TV VARIETY SHOW |
| | FASHION |
| | LIVING / HOUSE |
| | HEALTH / MEDICAL SERVICE |
| | SHOPPING / TELEPHONE SHOPPING |
| | GOURMET / COOKING |
| | EVENTS |
| | PROGRAM INTRODUCTION / ANNOUNCEMENT |
| | OTHERS |
| DRAMA | (NOT SPECIFIED) |
| | DOMESTIC DRAMA |
| | OVERSEAS DRAMA |
| | SAMURAI DRAMA |
| | OTHERS |
| MUSIC | (NOT SPECIFIED) |
| | DOMESTIC ROCK / POP MUSIC |
| | OVERSEAS ROCK / POP MUSIC |
| | CLASSICAL / OPERA |
| | JAZZ / FUSION |
| | POPULAR SONG / ENKA |
| | LIVE / CONCERT |
| | RANKING / REQUEST |
| | KARAOKE / SINGING CONTEST |
| | FOLK SONG / TRADITIONAL JAPANESE MUSIC |
| | CHILDREN'S SONG / KIDS |
| | ETHNIC MUSIC / WORLD MUSIC |
| | OTHERS |

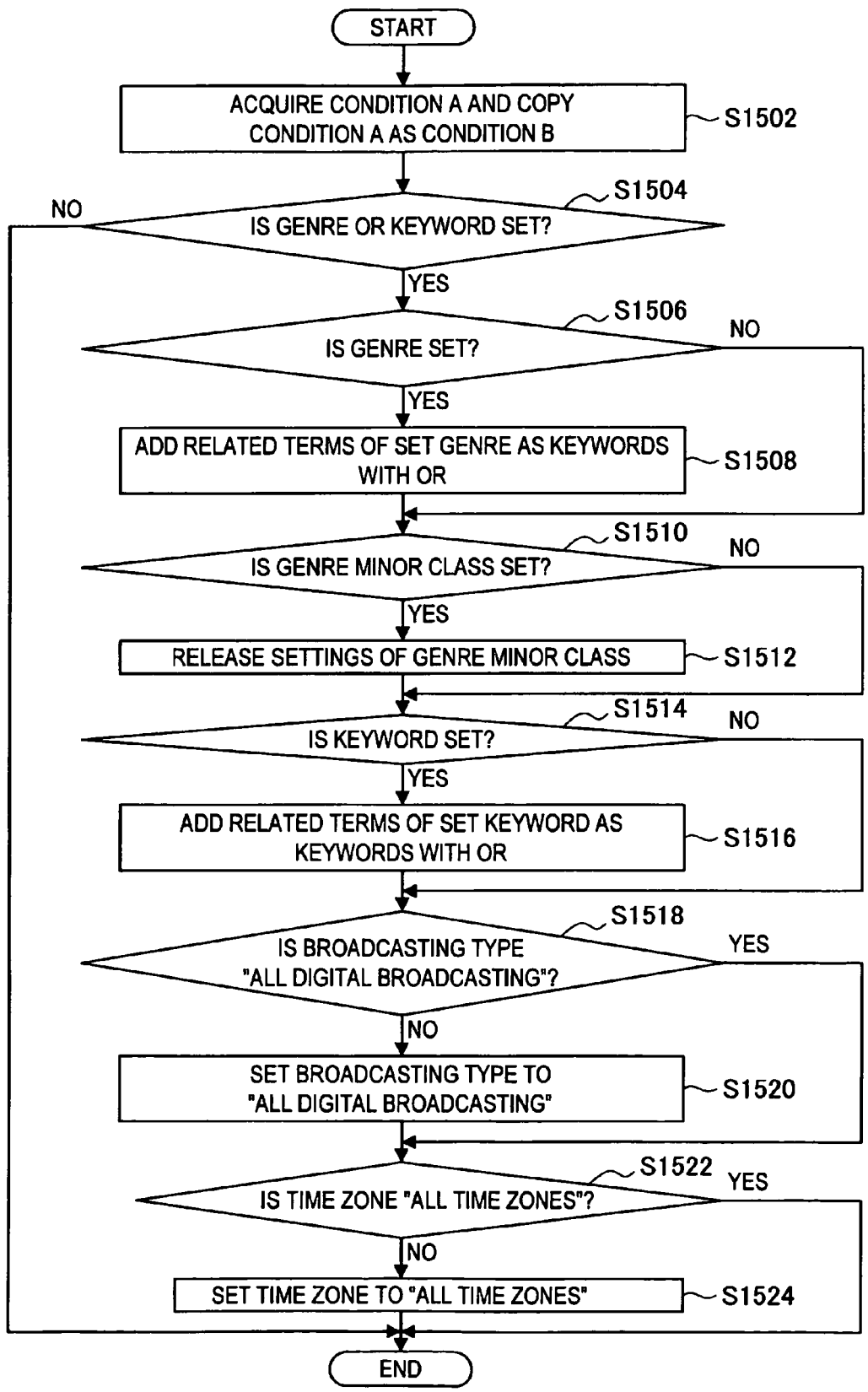

FIG.6

| MAJOR CLASS ~1811 | MINOR CLASS ~1812 | RELATED TERM ~1813 |
|---|---|---|
| SPORTS | NOT SPECIFIED | SPORTS, ATHLETE, MATCH, CHAMPIONSHIP |
| SPORTS | SPORTS NEWS | SPORTS NEWS |
| SPORTS | BASEBALL | BASEBALL, BIG LEAGUES, MAJOR LEAGUES |
| SPORTS | SOCCER | FOOTBALL, JJ LEAGUE, PREMIUM LEAGUE, SERIE B |
| ... | ... | ... |

FIG.7

| HEADWORD | RELATED TERM |
|---|---|
| SOCCER | FOOTBALL, JJ LEAGUE, PREMIUM LEAGUE, SERIE B |
| FOOTBALL | SOCCER, JJ LEAGUE, PREMIUM LEAGUE, SERIE B |
| ... | ... |

1821  1822

INFORMATION PROCESSING APPARATUS, INFORMATION PROCESSING METHOD AND COMPUTER PROGRAM

CROSS-REFERENCE TO RELATED APPLICATION

The present application claims priority from Japanese Patent Application No. JP 2008-167491 filed in the Japanese Patent Office on Jun. 26, 2008, the entire content of which is incorporated herein by reference.

BACKGROUND OF THE INVENTION

1. Field of the Invention

The present invention relates to an information processing apparatus, an information processing method, and a computer program, and in particular, relates to an information processing apparatus, an information processing method, and a computer program capable of recording content.

2. Description of the Related Art

To record a TV program or the like in a recording medium using a recording setting function, a user can make a recording setting by checking a broadcasting schedule of a desired program and setting a broadcasting channel, broadcasting time, recording mode and the like of the program. Moreover, in recent years, EPG (Electronic Program Guide), which is information about broadcasting dates/times, genres, content and the like of TV programs and contents, is provided. The user can also make a recording setting by selecting EPG data corresponding to a desired program or contents.

To reduce user operations for recording settings, a device that automatically records programs and the like according to user's preferences by referencing search keys input by the user, a recording history of programs by the user, and a viewing history of programs (For example, Japanese Patent No. 3991212 and Japanese Patent Application Laid-Open No. 2004-48718). According to such a device, user's preferences are analyzed based on the recording history and viewing history, and programs are automatically recorded even without an explicit instruction of recording from the user.

SUMMARY OF THE INVENTION

Usually, an automatic recording is made by matching search keys input by the user, a recording history of programs by the user, and a viewing history of programs with genres and the like of programs contained in EPG data and selecting matched programs for recording. However, in automatic recording settings based on EPG, programs desired by the user may not be selected for recording because detailed information about programs is lacking or an inappropriate genre is attached in EPG data. If, on the other hand, decision conditions for deciding programs to be recorded are relaxed so that desired programs should not be missing for recording, a vast amount of programs will be recorded. Thus, there is an issue that it becomes difficult to search for a desired program from recorded programs when the user wants to view the program or the capacity of recording media is lacking.

Thus, the present invention has been developed in view of the above issue and there is a need for a novel and improved information processing apparatus, information processing method, and computer program capable of providing contents of content desired by a user.

According to an embodiment of the present invention, there is provided an information processing apparatus, including a receiving part that receives contents, an input part into which designation information to select desired contents is input from a user, a recording setting information generation part that generates recording setting information of contents to be recorded based on the designation information, an analysis part that analyzes relevance of content of the contents being recorded to be recorded based on the recording setting information to the designation information, and an acquisition part that acquires the desired contents of the user from the recorded contents based on an analysis result by the analysis part.

According to the present invention, recording setting information of contents is generated based on the designation information input by the user. Then, while contents selected by the analysis part for recording being recorded, relevance of content of the contents to the designation information from the user is analyzed. Based on analysis results by the analysis part, the acquisition part acquires contents considered to be content desired by the user from the contents to be recorded. Thus, by determining whether or not content to be desired by the user based on content of the contents, contents of content desired by the user can be provided.

Here, the recording setting information generation part may include a condition generation part that generates search conditions for extracting the contents to be recorded and a search part that searches for the contents matching the search conditions.

The condition generation part may generate a first search condition based on the designation information and a second search condition by relaxing the first search condition, and the search part may search for the contents matching the first search condition and the contents matching the second search condition.

The information processing apparatus in the present invention may further include a setting information storage part that associates and stores classification information for classifying the contents into predetermined categories and related terms related to the classification information. In this case, the condition generation part acquires related terms associated with classification information of the contents set as the first search condition from the setting information storage part to set the related terms as the second search condition. The setting information storage part may further associate and store a keyword and related terms related to the keyword, and related terms associated with the keyword may be included in the second search condition.

The condition generation part may automatically generate the second search condition.

The analysis part may further include a feature extraction part that extracts feature quantities representing feature portions based on content of the contents being recorded, a feature analysis part that analyzes features of the contents being recorded based on the feature quantities, and a relevance determination part that determines relevance of features of the contents analyzed by the feature analysis part to the designation information.

The feature extraction part may extract, for example, at least one of images, sound (collectively referred to as "image/sound"), and subtitle information in the contents being recorded as the feature quantities. The feature analysis part may analyze only the contents that match the second search condition.

Further, the feature analysis part may terminate an analysis if relevance of features of the contents to the designation information is not found by the relevance determination part within a predetermined time.

The information processing apparatus in the present invention may further include a content storage part that stores the contents and a recording part that records the contents in the content storage part. In this case, the recording part may record the contents in the content storage part based on the recording setting information and may delete the contents from the content storage part if the relevance determination part determines that features of the contents are not relevant to the designation information.

According to another embodiment of the present invention, there is provided an information processing method, including the steps of: receiving contents; inputting designation information to select desired contents from a user; generating recording setting information of contents to be recorded based on the designation information; analyzing relevance of content of the contents being recorded to be recorded based on the recording setting information to the designation information; and acquiring the desired contents of the user from the recorded contents based on an analysis result.

According to another embodiment of the present invention, there is provided a computer program causing a computer to function, including means for receiving contents, means for inputting designation information to select desired contents from a user, means for generating recording setting information of contents to be recorded based on the designation information, means for analyzing relevance of content of the contents being recorded to be recorded based on the recording setting information to the designation information, and means for acquiring the desired contents of the user from the recorded contents based on an analysis result by the analysis means.

Such a computer program can cause hardware resources of a computer including a CPU, ROM, and RAM to perform the above functions. That is, a computer using the program can be caused to function as the above information processing apparatus.

According to the embodiments of the present invention, an information processing apparatus, an information processing method, and a computer program capable of providing contents of content desired by a user can be provided.

BRIEF DESCRIPTION OF THE DRAWINGS

FIG. 4 is an explanatory view exemplifying a classification table by genre of contents stored in an EPG storage part according to the embodiment;

FIG. 5 is a flow chart showing the method for generating a condition B, which is a second search condition;

FIG. 6 is an explanatory view exemplifying a related terms list stored in setting information according to the embodiment;

FIG. 7 is an explanatory view exemplifying a related terms dictionary stored in the setting information according to the embodiment;

DETAILED DESCRIPTION OF THE PREFERRED EMBODIMENTS

Figure 1:
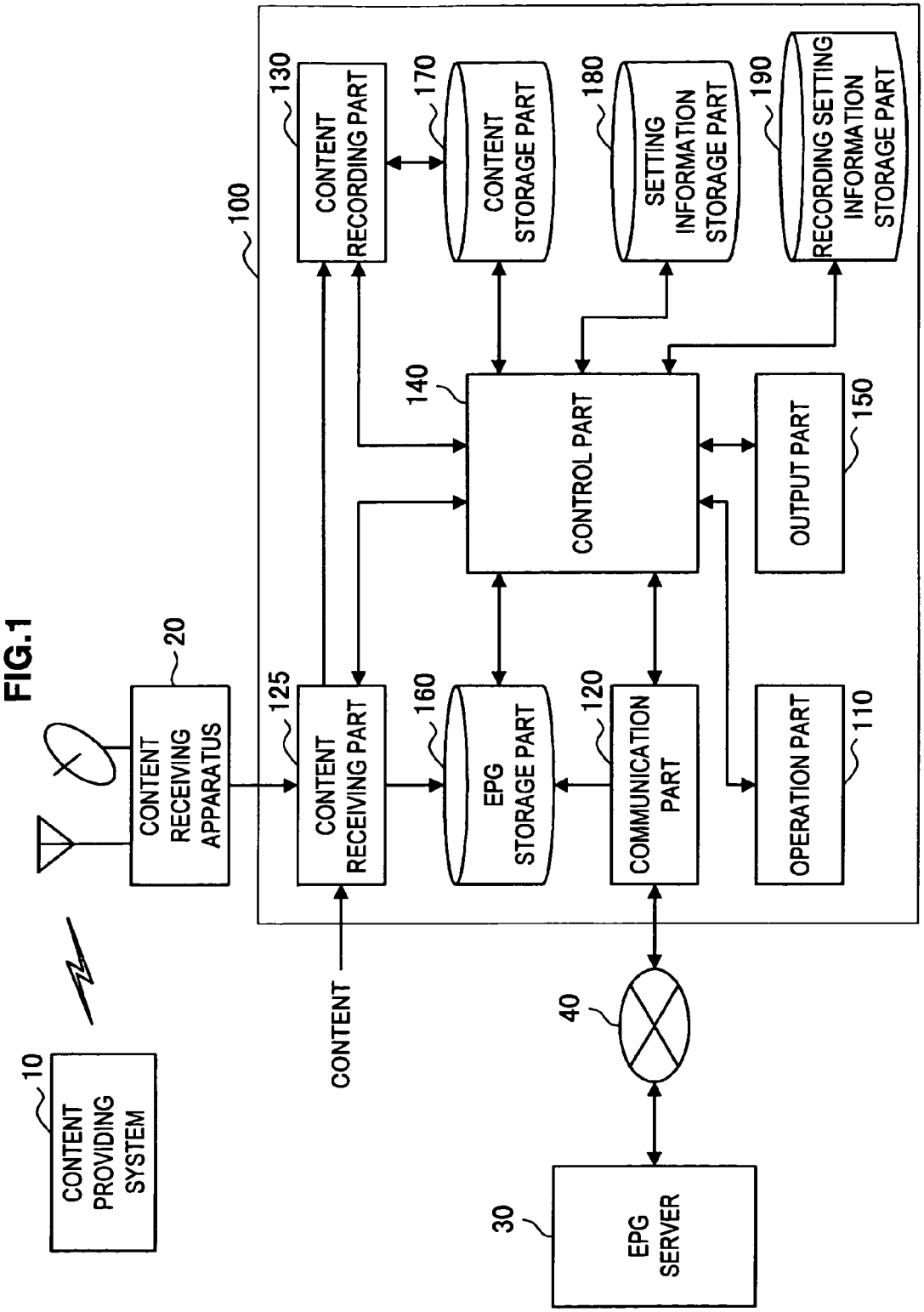
FIG. 1 is a block diagram showing a configuration of a recording apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Configuration of the Recording Apparatus>

First, a recording apparatus 100, which is an information processing apparatus according to an embodiment of the present invention, will be described based on FIG. 1. FIG. 1 is a block diagram showing a configuration of the recording apparatus according 100 to the present embodiment.

The recording apparatus 100 according to the present embodiment is an apparatus that records contents in a recording medium. As shown in FIG. 1, the recording apparatus 100 is connected to a content receiving apparatus 20 that receives contents and EPG data from a content providing system 10 that sends out contents and EPG data and an EPG server 30 that holds EPG data. The content receiving apparatus 20 may be contained in the recording apparatus 100.

The content providing system 10 is a system to provide contents. The content providing system 10 has, for example, a broadcasting station including an apparatus that sends out TV programs and contents by satellite digital broadcasting using a satellite, an apparatus that sends out TV programs and contents by terrestrial digital broadcasting, or an apparatus that sends out TV programs and contents by cable broadcasting such as CATV. The recording apparatus 100 receives TV programs and contents from the content providing system 10 and records the received TV programs and contents. "Contents" below are assumed to include TV programs.

As shown in FIG. 1, the recording apparatus 100 according to the present embodiment includes an operation part 110, a communication part 120, a content receiving part 125, a content recording part 130, a control part 140, an output part 150, an EPG storage part 160, a content storage part 170, a setting information storage part 180, and a recording setting information storage part 190.

The operation part 110 functions as an input part through which operation information to operate the recording apparatus 100 is input. The operation part 110 receives operation information input, for example, using a separate remote controller (not shown) or an operation panel of the recording apparatus 100 and outputs the operation information to the control part 140.

The communication part 120 receives EPG data from the EPG server 30 connected to the recording apparatus 100 via a network 40 and sends contents such as audience rating information and recording rate information and related data about EPG data to the EPG server 30. The communication part 120 stores the EPG data received from the EPG server 30 in the EPG storage part 160. The communication part 120 is connected to the control part 140 in a way that allows transmission/reception of data therebetween.

The content receiving part 125 has contents and EPG data received by the content receiving apparatus 20 input thereto. The content receiving part 125 sends the input contents to the content recording part 130. The content receiving part 125 also stores the EPG data in the EPG storage part 160. The content receiving part 125 is connected to the control part 140 in a way that allows transmission/reception of data therebetween.

The content recording part 130 stores contents input from the content receiving part 125 in the content storage part 170. The content recording part 130 is connected to the control part 140 and can record and delete contents stored in the content storage part 170 according to instructions from the control part 140.

The control part 140 controls each function part and the whole apparatus of the recording apparatus 100. The control part 140 generates setting information based on, for example, operation information input from the operation part 110 and records the setting information in the setting information storage part 180. The control part 140 also causes the communication part 120 or the content receiving part 125 to store received EPG data in the EPG storage part 160 or the content recording part 130 to store contents in the content storage part 170. The control part 140 also records recording setting information input from the operation part 110 or recording setting information automatically generated by the control part 140 in the recording setting information storage part 190. The control part 140 can also provide information to the user via the output part 150. The control part 140 includes a recording setting information generation part 410 and a recording control part 420 described later.

The output part 150 outputs various kinds of information such as EPG data, setting information, and history information. The output part 150 causes an external display device such as a display to display such information according to instructions of the control part 140.

The EPG storage part 160 is a storage part to store EPG data. The EPG storage part 160 stores EPG data received by the communication part 120 or the content receiving part 125. The EPG storage part 160 also stores a classification table in which major classes and minor classes to classify TV programs and contents are associated (See FIG. 4).

The content storage part 170 is a storage part to store contents. The content recording part 130 records/deletes contents in/from the content storage part 170. That is, programs and contents recorded in the recording apparatus 100 according to the present embodiment are recorded in the content storage part 170.

The setting information storage part 180 is a storage part to store setting information, which is preset information. The setting information storage part 180 stores, for example, a related terms list (See FIG. 6) associating major classes and minor classes of EPG data and related terms related to these major classes and minor classes and a related terms dictionary (See FIG. 7) associating keywords and related terms related to these keywords as setting information. Such setting information is used, for example, when search conditions for contents are generated.

The recording setting information storage part 190 is a storage part to store recording setting information of programs and contents. The control part 140 exercises control to record programs and contents based on recording setting information stored in the recording setting information storage part 190.

The configuration of the recording apparatus 100 according to the present embodiment has been described. As described above, the recording apparatus 100 according to the present embodiment records contents received by the content receiving apparatus 20 based on recording setting information input by the user or recording setting information generated based on EPG data. Here, the recording apparatus 100 is characterized in that the recording apparatus 100 extends the range of TV programs and contents to be recorded and analyzes content each of TV programs and contents selected for recording to present only TV programs and contents desired by the user. Thus, recording processing of contents in the recording apparatus 100 according to the present embodiment will be described in detail below.

Figure 2:
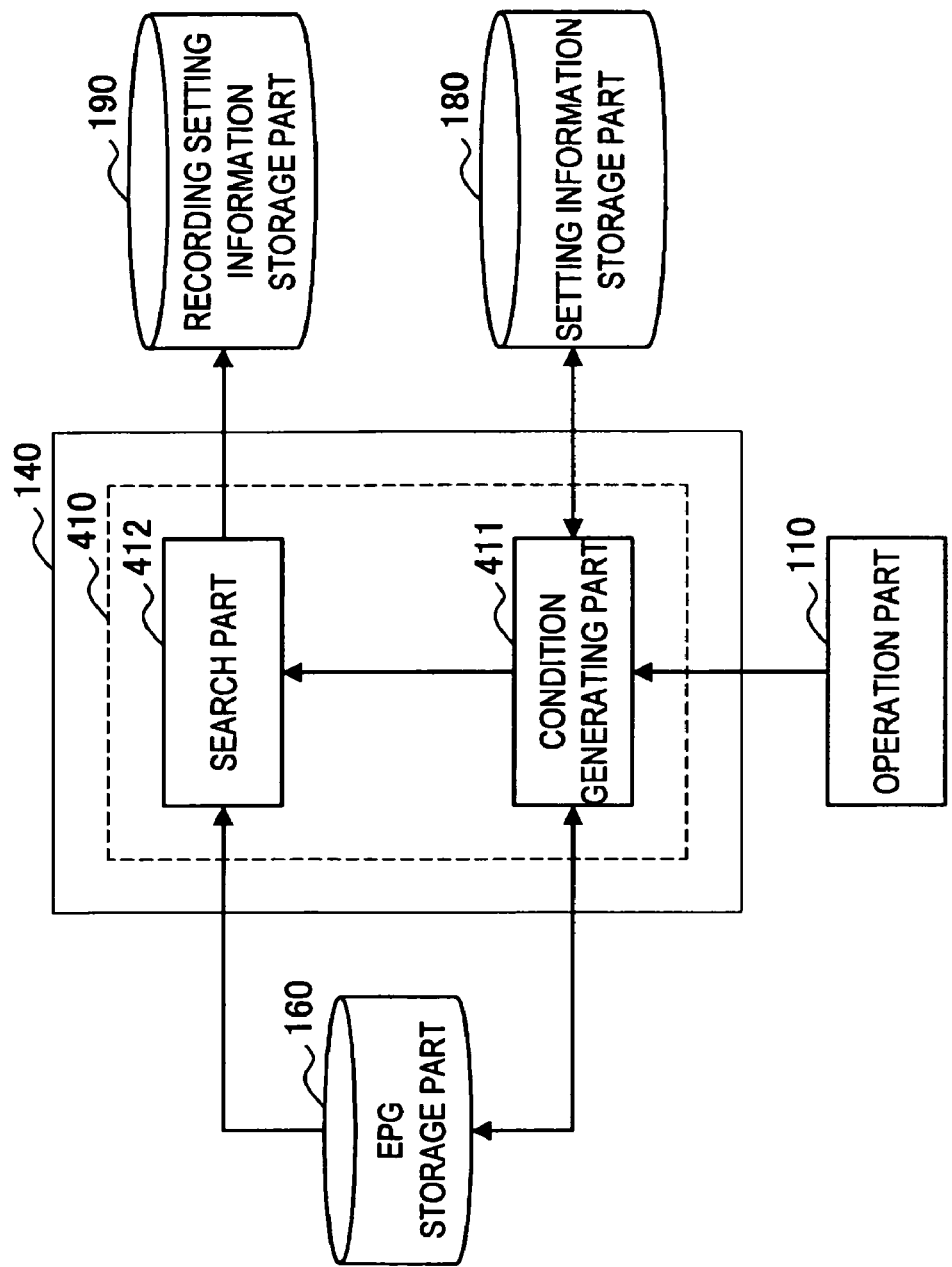
FIG. 2 is a block diagram showing the configuration of a recording setting information generation part according to the embodiment.
Figure 3:
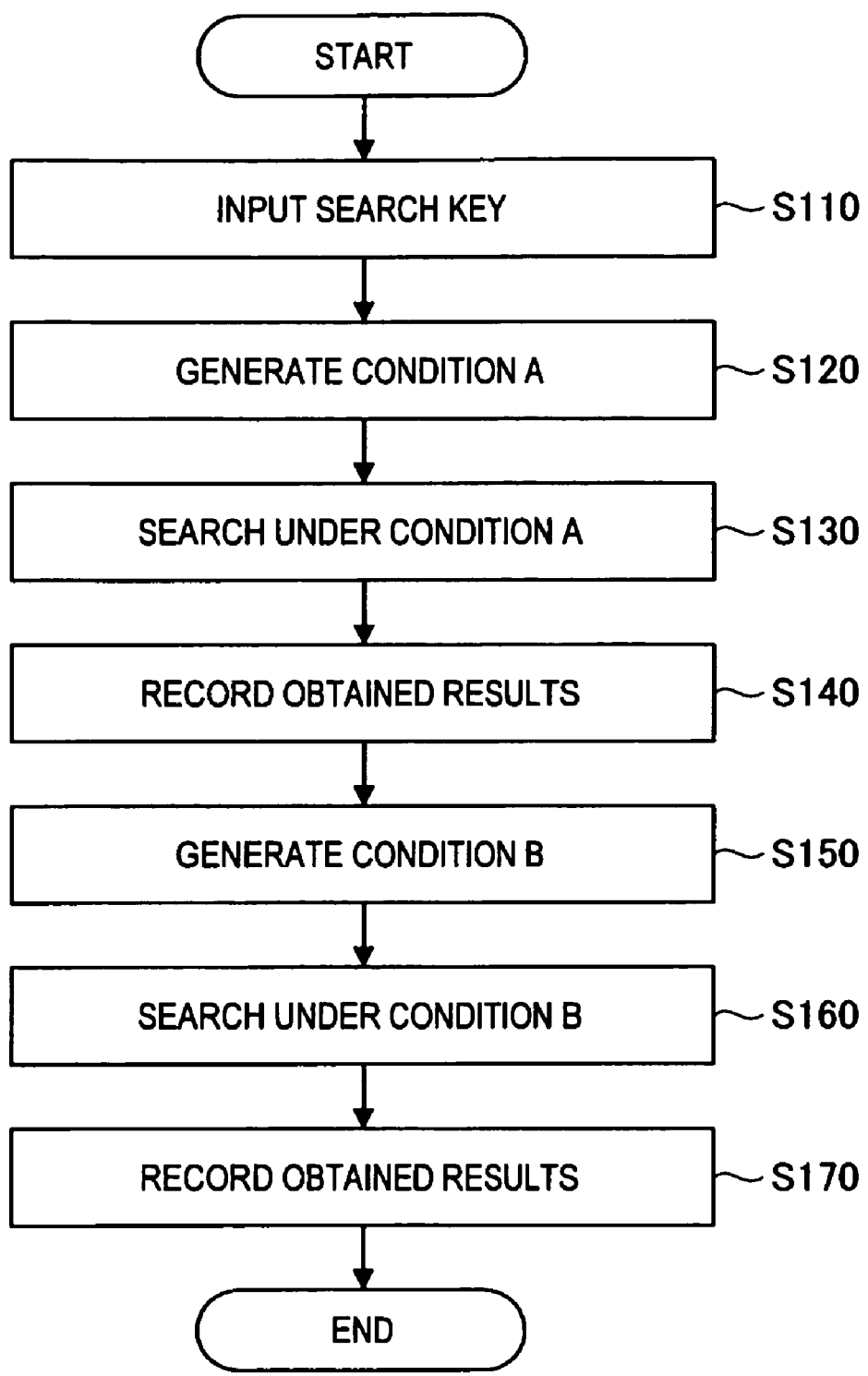
FIG. 3 is a flow chart showing a method for generating search conditions according to the embodiment.

First, the selection of contents to be recorded in the recording apparatus 100 according to the present embodiment will be described based on FIG. 2 to FIG. 7. FIG. 2 is a block diagram showing the configuration of the recording setting information generation part 410 according to the present embodiment. FIG. 3 is a flow chart showing a method for generating search conditions according to the present embodiment. FIG. 4 is an explanatory view exemplifying a classification table by genre of contents stored in the EPG storage part 160 according to the present embodiment. FIG. 5 is a flow chart showing the method for generating a condition B, which is a second search condition. FIG. 6 is an explanatory view exemplifying a related terms list stored in the setting information storage part 180 according to the present embodiment. FIG. 7 is an explanatory view exemplifying a related terms dictionary stored in the setting information storage part 180 according to the present embodiment.

<Configuration of Recording Setting Information Generation Part>

The recording apparatus 100 according to the present embodiment decides contents to be recorded based on search keys, which are instruction information input by the user. The control part 140 of the recording apparatus 100 includes, as shown in FIG. 2, the recording setting information generation part 410 to record the decided contents. The recording setting information generation part 410 includes a condition generation part 411 and a search part 412.

The condition generation part 411 generates conditions for searching for contents to be recorded. The recording apparatus 100 according to the present embodiment decides contents to be recorded based on two search conditions of a first search condition (defined as a "condition A") set based on search keys input by the user and a second search condition (defined as the "condition B") obtained by relaxing the first search condition. The method for generating the condition A and condition B will be described later. The condition generation part 411 generates search conditions by referencing the EPG storage part 160 and the setting information storage part 180. Then, the condition generation part 411 outputs generated conditions to the search part 412.

The search part 412 searches for contents to be recorded based on search conditions generated by the condition generation part 411. The condition generation part 411 searches the EPG storage part 160 to extract contents matching conditions and generates recording setting information of contents to be recorded. Then, the search part 412 records the generated recording setting information in the recording setting information storage part 190.

The configuration of the recording setting information generation part 410 according to the present embodiment has been described above. Next, recording setting information generation processing by the recording setting information generation part 410 will be described based on FIG. 3 to FIG. 7.

<Recording Setting Information Generation Processing>

In the recording setting information generation processing according to the present embodiment, as shown in FIG. 3, when the user inputs a search key from the operation part 110 (step S110), the condition generation part 411 creates the condition A (step S120). The search by the condition A can be made to be a search in related art. For example, the condition A can be generated by predetermined items such as the broadcasting type, handling of pay broadcasting, broadcasting time zone, genre, and keywords being set by the user.

In settings of each item, for example, regarding the broadcasting type, one of "All digital broadcasting", "Terrestrial digital broadcasting", "BS digital broadcasting", and "Wideband CS digital broadcasting" is selected. Regarding handling of pay broadcasting, whether to include pay broadcasting for recording is set. Regarding the time zone, one of "All time zones", "Morning (5:00 AM to 0:00 PM)", "Afternoon (11:00 AM to 6:00 PM)", "Evening (5:00 PM to 0:00 AM)", and "Midnight (11:00 PM to 5:00 AM)" is selected. Regarding the genre, one of "Major class only", "Combination of major class and minor class corresponding to the major class", and "No designation" is selected. Regarding the keyword, any search key designated by free input of the user can be used. When a plurality of search keys is input, these search keys may be ANDed or ORed. If there is no search key designated by free input, the keyword is assumed not to be set.

In this manner, each item is set based on search keys input by the user and, for example, a condition obtained by these items being ANDed or ORed can be set as the condition A. If, for example, the user inputs "Soccer" as the search key (keyword), based on the classification table shown in FIG. 4, "Sports" is set as a major class 161 regarding the genre and "Soccer" is set as a minor class 162. In this case, if no other item is set, the condition A will be "Sports AND Soccer". After generating the condition A, the condition generation part 411 outputs the condition A to the search part 412. The generated condition A can also be stored in a memory (not shown).

Next, contents to be recorded are searched for by the search part 412 using the condition A (step S130). The search part 412 acquires contents matching the condition A from the EPG storage part 160 and records recording setting information for the contents in the recording setting information storage part 190. As described above, the EPG storage part 160 has information (EPG data) of broadcasting dates/times, genres, content and the like of TV programs and contents stored therein. The search part 412 searches the EPG data and extracts contents matching the condition A. Then, the search part 412 creates recording setting information for recording the extracted contents. The recording setting information is created based on EPG data and includes, for example, the contents ID to determine contents, the recording start time and recording end time, and information such as relevant search conditions indicating contents match the condition A.

When the search using the condition A ends, the condition generation part 411 automatically generates the condition B (step S150). The condition B is a more relaxed search condition than the condition A and more contents are considered to match the condition B than the condition A. By setting the condition B described above, the range of contents to be recorded can be extended.

Here, the method for generating the condition B will be described based on FIG. 5. Before generating the condition B, the condition generation part 411 acquires the condition A set previously to set the condition B as the initial condition (step S1502). By generating the condition B on the basis of the condition A, contents deviating from user's desires can be prevented from being extracted.

Next, whether at least one of the genre and keyword is set in the condition A (step S1504). If neither genre nor keyword of the condition A is set at step S1504, processing terminates without the condition B being set. This is because the condition B is effective only if contents are narrowed down to a certain degree by the condition A. If, on the other hand, the genre or keyword of the condition A is set, processing at step S1506 and thereafter will be performed.

At step S1506, whether any genre is set in the condition A is determined. If it is determined at step S1506 that the genre is set, related terms of the set genre are added to the condition B (step S1508). The recording apparatus 100 according to the present embodiment has a preset related terms list 181 stored in the setting information storage part 180. The related terms list 181 is a list generated by associating terms related to the genre with the genre and can be configured, for example, as shown in FIG. 6. The related terms list 181 shown in FIG. 6 is configured by associating a major class 1811 and a minor class 1812 of the genre and related terms 1813.

The condition generation part 411 references the related terms list 181 of the setting information storage part 180 and generates a search condition (condition B) containing at least one related term related to the classification of the genre. Accordingly, even if a program to which no genre code of the set genre is attached, the program can be selected for recording contents containing a keyword related to the set genre. If, on the other hand, it is determined at step S1506 that no genre is set, processing proceeds to step S1510.

Next, whether any minor class is set in the genre is determined (step S1510). If any minor class of the genre is designated at step S1510, such designated minor classes are released (step S1512). By releasing minor classes of the genre, contents to which the designated minor class of the genre is not attached, but have the same major class can also be selected for recording. If, on the other hand, it is determined at step S1510 that no genre is set, processing proceeds to step S1514.

Further, whether any keyword is set in the condition A is determined (step S1514). If it is determined at step S1514 that a keyword is set, related terms of the set keyword are added to the condition B generated at step S1508 (step S1516). Here, the recording apparatus 100 has a preset related terms dictionary 182 stored in the setting information storage part 180. The related terms dictionary 182 associates terms related to keywords and the keywords and can be configured, for example, as shown in FIG. 7. The related terms dictionary 182 shown in FIG. 7 is configured by associating a headword 1821 and a related term 1822.

The condition generation part 411 searches for any headword matching the keyword set by the user by referencing the related terms dictionary 182 of the setting information storage part 180 and acquires related terms related to the headword. Then, the condition generation part 411 adds the related terms to the condition B generated at step S1508 and sets the condition B as including at least one of the related terms included in the condition B. If, on the other hand, it is determined at step S1514 that no keyword is set, processing proceeds to step S1518.

Subsequently, whether the broadcasting type set in the condition A is "All digital broadcasting" is determined (step S1518). If it is determined that the broadcasting type set in the condition A is not "All digital broadcasting", the broadcasting type is set to "All digital broadcasting" (step S1520). By releasing the setting of the broadcasting type in this manner, contents of other types than the set broadcasting type can be selected for recording. If, on the other hand, the broadcasting type is "All digital broadcasting", processing proceeds to step S1522.

Next, whether the time zone set in the condition A is "All time zones" (step S1522). If it is determined that the time zone set in the condition A is not "All time zones", the time zone is set to "All time zones" (step S1524). By releasing the setting of the time zone in this manner, contents of other time zones than the set time zone can be selected for recording. If, on the other hand, the time zone is "All time zones", processing terminates.

The method for generating the condition B has been described. Thus, the condition generation part 411 acquires related terms related to the condition A based on the condition A and generates the condition B by relaxing setting conditions such as the broadcasting type and time zone of the condition B. Accordingly, contents that do not correspond to the condition A, but are highly likely to be content desired by the user can be included as contents to be recorded. Incidentally, regarding handling of pay broadcasting, the state set in the condition A is not changed when generating the condition B to prevent billing unintended by the user.

Returning to the description of FIG. 3, after the condition B being generated at step S150, the search part 412 searches for contents to be recorded based on the condition B (step S160). The search part 412 acquires contents matching the condition B from the EPG storage part 160 and generates recording setting information for recording the contents. Then, the search part 412 records the generated recording setting information in the recording setting information storage part 190 (step S170).

Processing to generate recording setting information of contents to be recorded by the recording apparatus 100 has been described above. Here, if a plurality of contents to be broadcast in the same time zone is extracted for recording, recording of contents matching the condition A in which user's intentions are directly reflected may take precedence over the condition B. If there is a plurality of contents extracted for recording and broadcast in the same time zone that match the condition A, information about contents to be recorded may be present to the user to allow the user to select one of the contents to be recorded. If, on the other hand, there is a plurality of contents extracted for recording and broadcast in the same time zone that match the condition B, for example, contents having the most items matching the condition A may be selected for recording or randomly.

<Association of Feature Quantities and Recording Setting Conditions>

Figure 8:
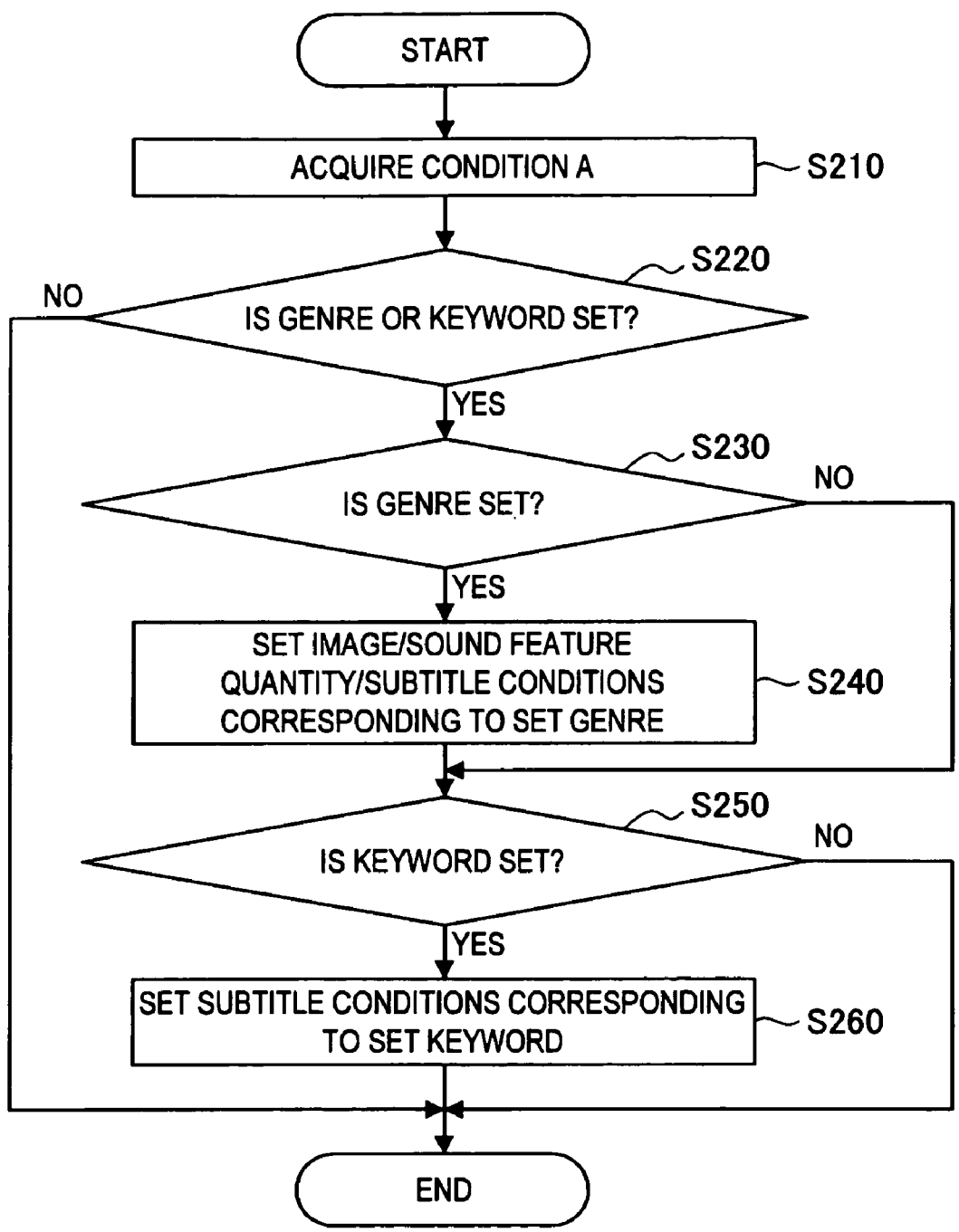
FIG. 8 is a flow chart showing processing to associate feature quantities and recording setting conditions according to the embodiment.

When recording setting information of contents to be recorded is generated in the recording apparatus 100, the recording apparatus 100 records contents based on the recording setting information. At this point, the recording apparatus 100 according to the present embodiment analyzes content of contents in parallel with recording of the contents to determine whether or not the contents being recorded are content desired by the user. To perform such analysis processing, the recording apparatus 100 sets conditions for features corresponding to each item of the genre in advance. Processing to associate feature quantities and recording setting conditions will be described below based on FIG. 8. FIG. 8 is a flow chart showing processing to associate feature quantities and recording setting conditions.

As shown in FIG. 8, processing to associate feature quantities and recording setting conditions is started with acquisition of the condition A (step S210). The condition A is a search condition in which user's intentions are directly reflected and is information suitable as feature quantities of contents. Next, whether or not at least one of the genre and keyword is set in the condition A (step S220). If neither genre nor keyword of the condition A is set at step S220, processing terminates because the condition A is excluded as a target for analysis on the basis of feature quantity. In, on the other hand, one of the genre and keyword of the condition A is set, processing at step S230 and thereafter will be performed.

At step S230, whether or not the genre is set in the condition A is determined. If it is determined that the genre is set, at least one of the image/sound feature quantity and subtitle information corresponding to the set genre is set (step S240). The image/sound feature quantity refers to lower-level features of images/sound of contents such as the distribution of color components (color histogram) contained in images of contents, the number and orientations of edges, sound volume and frequency components of sound and the like. The recording apparatus 100 according to the present embodiment acquires and analyzes image/sound feature quantities of contents to extract higher-level features. At step S240, processing to associate image/sound feature quantities or subtitle information with recording setting information is performed. Thus, the recording apparatus 100 includes an image recognition part (not shown) to recognize content of contents based on image feature quantities of contents and a sound recognition part (not shown) to recognize the frequency with which a keyword appears as sound in contents based on sound feature quantities of contents.

For example, when the major class of the genre of the condition A is "Sports" and the minor class is "Soccer", if the image recognition part detects images of soccer for a predetermined time or more, the recording apparatus 100 is set to determine that contents thereof relate to soccer. If the sound recognition part recognizes related terms of the "Soccer" genre extracted from the related terms list 181 a predetermined number of times or more, the recording apparatus 100 is set to determine that contents thereof relate to soccer. If, on the other hand, it is determined at step S240 that no genre is set, processing proceeds to step S250.

Next, whether or not any keyword is set in the condition A is determined (step S250). If it is determined that a keyword is set, the recording apparatus 100 is set to extract the keyword as features in content of contents (step S260). At this point, the appearance of the keyword in subtitle is set as a condition. That is, the recording apparatus 100 determines whether contents being recorded are content desired by the user based on the frequency with which the designated keyword appears in the subtitle. Thus, the recording apparatus 100 includes a detection part (not shown) to detect the frequency with which the keyword appears in the subtitle of contents.

It is assumed, for example, that the major class of the genre of the condition A is "Sports" and the minor class is "Soccer". In this case, if the detection part detects related terms of the "Soccer" genre extracted from the related terms list 181 a predetermined number of times or more in the subtitle, the recording apparatus 100 is set to determine that contents thereof relate to soccer. If, on the other hand, it is determined at step S250 that no keyword is set, processing terminates.

Figure 9:
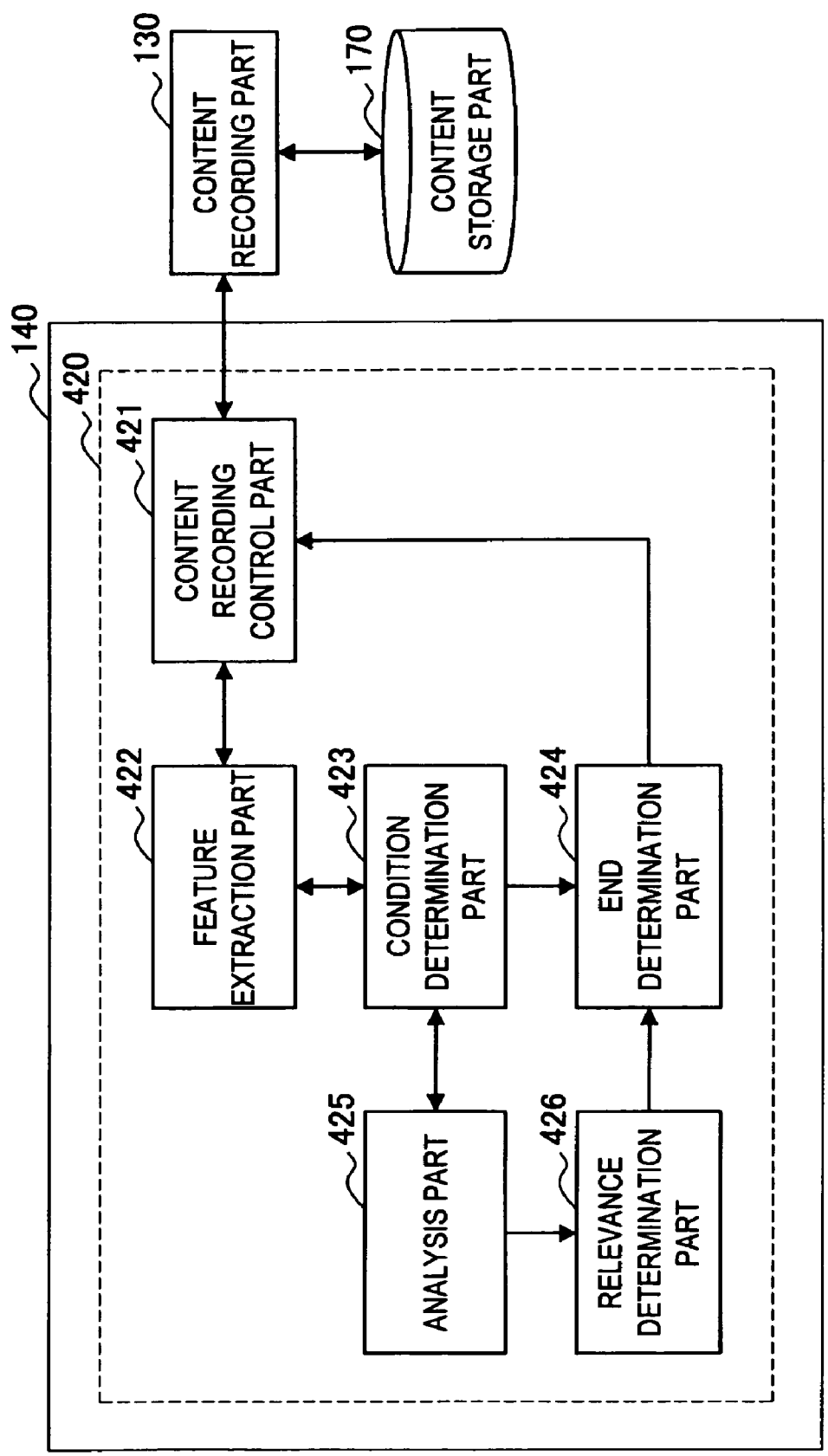
FIG. 9 is a block diagram showing a recording control part to control recording of contents according to the embodiment.
Figure 10:
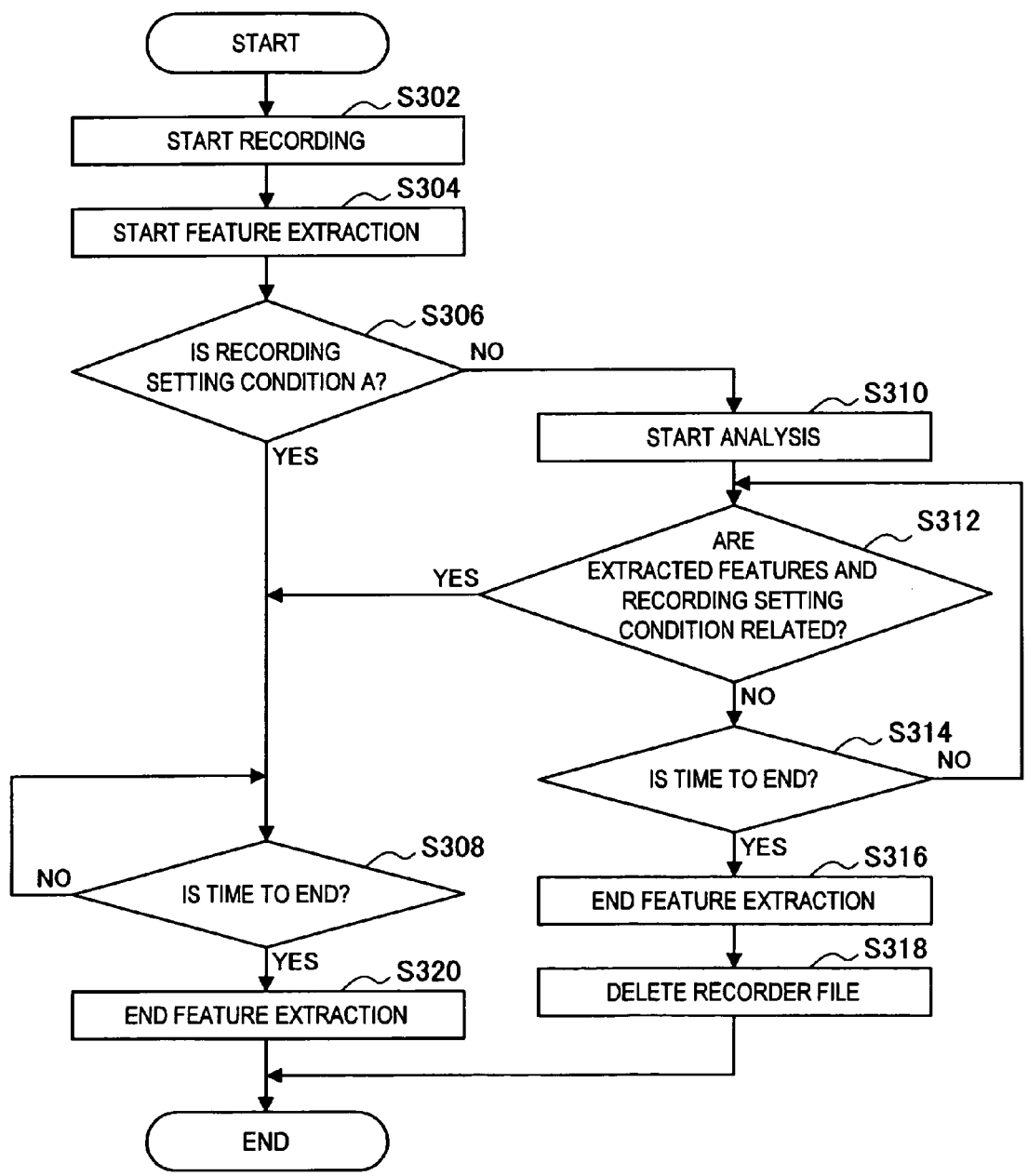
FIG. 10 is a flow chart showing recording processing of contents according to the embodiment.

Processing to associate feature quantities and recording setting conditions has been described above. When recording of contents based on recording setting information starts, the recording apparatus 100 according to the present embodiment starts to analyze content of the contents based on conditions set by association of feature quantities and recording setting conditions. Then, the recording apparatus 100 determines whether or not contents being recorded are content desired by the user. If the recording apparatus 100 determines that the contents are not desired content, the recording apparatus 100 stops or deletes recording of the contents. Thus, the recording apparatus 100 according to the present embodiment narrows down recorded contents to those contents to be actually presented to the user. Processing when contents are recorded will be described below based on FIG. 9 and FIG. 10. FIG. 9 is a block diagram showing the recording control part 420 to control recording of contents according to the present embodiment. FIG. 10 is a flow chart showing recording processing of contents according to the present embodiment.

<Configuration of Recording Control Part>

As shown in FIG. 9, the recording apparatus 100 according to the present embodiment includes the recording control part 420 to control recording of contents in the control part 140. The recording control part 420 includes a content recording control part 421, a feature extraction part 422, a condition determination part 423, a termination determination part 424, an analysis part 425, and a relevance determination part 426.

The content recording control part 421 controls the content recording part 130 based on recording setting information or analysis results. The content recording control part 421 instructs the content recording part 130 to start recording of contents based on recording setting information. After instructing the content recording part 130 to start recording of contents, the content recording control part 421 instructs the feature extraction part 422 to extract feature quantities. The content recording control part 421 can also instruct the content recording part 130 to end recording of contents based on analysis results.

The feature extraction part 422 extracts image/sound feature quantities or subtitle information based on content of contents. After the content recording part 130 starts to record contents following instructions from the content recording control part 421, the feature extraction part 422 extracts image/sound feature quantities or subtitle information based on content of the contents. The feature extraction part 422 outputs the extracted image/sound feature quantities or subtitle information to the condition determination part 423.

The condition determination part 423 determines whether recorded contents correspond to the condition A or the condition B. The condition determination part 423 acquires the type of condition to which the contents correspond from recording setting information stored in the recording setting information storage part 190. The condition determination part 423 outputs instructions to the termination determination part 424 or the analysis part 425 depending on the type of condition. Details of the determination processing will be described later.

The termination determination part 424 determines whether or not to terminate extraction processing of feature quantities of contents. The termination determination part 424 can determine whether to terminate extraction processing of feature quantities based on, for example, the termination time of recording of contents. When the termination determination part 424 determines to terminate extraction processing of feature quantities, the termination determination part 424 outputs a termination instruction to the content recording control part 421.

The analysis part 425 acquires image/sound feature quantities and subtitle information based on content of recorded contents to analyze the image/sound feature quantities and subtitle information. The analysis part 425 starts the analysis following instructions from the condition determination part 423 and outputs analysis results to the relevance determination part 426.

The relevance determination part 426 determines whether or not recorded contents are related to content desired by the user based on associations of feature quantities and recording setting conditions and analysis results by the analysis part 425 preset according to processing shown in FIG. 8. The relevance determination part 426 is a function part to determine whether or not to record contents being recorded to the end based on a determination result of relevance and functions as an acquisition part to acquire contents to be presented to the user in the end. The relevance determination part 426 outputs a determination result to the termination determination part 424.

The configuration of the recording control part 420 according to the present embodiment has been described above. Next, recording processing of contents according to the present embodiment will be described based on FIG. 10.

<Recording Processing of Contents>

After starting recording of contents based on recording setting information (step S302), the recording apparatus 100 according to the present embodiment starts extraction of feature quantities of contents (step S304). The feature extraction part 422 extracts feature quantities of contents following instructions of the content recording control part 421. As described above, features extracted at step S302 are lower-level features such as images/sound of contents and subtitle information.

Next, the condition determination part 423 determines the type of condition of recorded contents (step S306). If contents being recorded match the condition A, the contents are considered to match user's intentions and thus, the condition determination part 423 according to the present embodiment does not analyze content of the contents. In that case, the contents are recorded to the end time of recording (step S308). Then, when the end time of recording contents comes, the condition determination part 423 terminates extraction of feature quantities of contents by the feature extraction part 422 (step S320) to terminate recording processing.

If, on the other hand, contents being recorded match the condition B at step S306, the contents do not necessarily match user's intentions because the contents match a relaxed extraction condition of contents when compared with the condition A. Thus, the recording apparatus 100 according to the present embodiment analyzes content of such contents to determine whether or not content of the contents matches user's intentions. Therefore, the condition determination part 423 instructs the analysis part 425 to start the analysis of content of the contents being recorded to start the analysis by the analysis part 425 (step S310).

After the analysis of content of the contents being started, the recording apparatus 100 determines whether or not extracted feature quantities and recording setting conditions are relevant (step S312). The determination is made based on preset relevance conditions of recording setting conditions and feature quantities. For example, when the user desires contents of soccer, if images of soccer are detected from image feature quantities for a predetermined time or more or related terms related to soccer are detected from subtitle information or sound a predetermined number of times or more, the recording apparatus 100 determines that content of the contents is desired by the user. In this case, processing proceeds to step S308 and the contents are recorded till the end time thereof.

On the other hand, while content of contents is not determined to be content desired by the user from feature quantities, the analysis of content of the contents is continued (step S314). If, for example, relevance to the recording setting condition is not found even after the analysis being continued till the end time of contents, feature quantity extraction processing is terminated (step S316). Analysis processing of content of the contents is also terminated together. Then, the content recording control part 421 instructs the content recording part 130 to delete a recording file of the contents whose relevance of content to the recording setting conditions is not found from content storage part 170 (step S318).

Recording processing of contents according to the present embodiment has been described above. In the recording processing of contents in the present embodiment, content of contents matching the condition B obtained by relaxing the condition A in which user's intentions are directly reflected is analyzed to determine whether or not the content is content desired by the user. By recording only contents matching content desired by the user by analyzing content of the contents while more contents are recorded by relaxing the search condition in this manner, recording media in which contents are recorded can be prevented from being lacking in capacity. Moreover, because contents are narrowed down, a large amount of contents will not be recorded.

The recording apparatus 100 according to the present embodiment and recording processing have been described. According to the present embodiment, contents to be recorded are extended by selecting contents matching the condition A generated based on search keys input by the user and those matching the condition B obtained by relaxing the condition A for recording. Then, at the time of recording, the recording apparatus 100 records only contents of content desired by the user by analyzing content of the contents. Thus, contents of content desired by the user can be recorded without omission by extending contents to be recorded and narrowing down the contents according to content thereof.

Accordingly, even if detailed information of contents is lacking or inappropriate information is attached in EPG data, contents can be determined to be contents desired by the user from analysis results of images, sound, subtitles and the like and selected for recording. Moreover, contents to be recorded are narrowed down based on analysis results of images, sound, subtitles and the like and thus, contents to be recorded can be prevented from uselessly increasing. Further, when viewing contents recorded by the user, the search for contents to be viewed can be made easier. In addition, capacity shortages of recording media can be eliminated.

It should be understood by those skilled in the art that various modifications, combinations, sub-combinations and alterations may occur depending on design requirements and other factors insofar as they are within the scope of the appended claims or the equivalents thereof.

In the above embodiment, for example, contents whose content is to be analyzed are only those matching the condition B, but the present invention is not limited to such an example. For example, contents matching the condition A may also be analyzed. Presentation of such analysis results to the user may be a help to the selection of programs to be viewed.

In the above embodiment, if the condition B and a search key are found to be irrelevant, contents thereof are deleted, but the present invention is not limited to such an example. For example, regarding contents for which no relevance is found, analysis results thereof may be presented to the user without deleting the recording file thereof. At this time, whether to delete the recording file may be left to a determination of the user.

Further, in the above embodiment, analysis processing is performed till the recording end time, but the present invention is not limited to such an example. As a termination condition for analysis processing, for example, a case of contents that do not correspond to content desired by the user for which strong relevance to another genre is found from analysis results of content of the contents may be set.

In the above embodiment, only one tuner is mounted in the recording apparatus 100, but the present invention is not limited to such an example, and a plurality of tuners may be mounted. In this case, it is desirable to set the condition B so as to record as many contents as possible.

What is claimed is:

1. An information processing apparatus, comprising:
    a receiving part that receives contents;
    an input part into which designation information to select desired contents is input from a user;
    a recording setting information generation part that generates recording setting information of contents to be recorded based on the designation information;
    an analysis part that analyzes relevance of content of the contents being recorded to be recorded based on the recording setting information to the designation information; and
    an acquisition part that acquires the desired contents of the user from the recorded contents based on an analysis result by the analysis part,
    wherein the information processing apparatus determines whether or not the designation information designates a genre, and when the designation information designates a genre, the analysis comprises analyzing image/sound feature qualities of the contents being recorded, and
    wherein the information processing apparatus determines whether or not the designation information is a keyword, and when the designation information is a keyword, the analysis comprises detecting the frequency with which the keyword appears in the subtitle of the contents being recorded.

2. The information processing apparatus according to claim 1, wherein
    the recording setting information generation part, comprises:
    a condition generation part that generates search conditions for extracting the contents to be recorded; and
    a search part that searches for the contents matching the search conditions.

3. The information processing apparatus according to claim 2, wherein
    the condition generation part generates a first search condition based on the designation information and a second search condition by relaxing the first search condition and
    the search part searches for the contents matching the first search condition and the contents matching the second search condition.

4. The information processing apparatus according to claim 3, further comprising
    a setting information storage part that associates and stores classification information for classifying the contents into predetermined categories and related terms related to the classification information, wherein
    the condition generation part acquires related terms associated with classification information of the contents set as the first search condition from the setting information storage part to set the related terms as the second search condition.

5. The information processing apparatus according to claim 4, wherein the setting information storage part further associates and stores a keyword and related terms related to the keyword and
    the condition generation part acquires related terms associated with the keyword set as the first search condition from the setting information storage part to set the related terms as the second search condition.

6. The information processing apparatus according to claim 5, wherein the condition generation part automatically generates the second search condition.

7. The information processing apparatus according to claim 1, wherein
the analysis part, comprises:
a feature extraction part that extracts feature quantities representing feature portions based on content of the contents being recorded;
a feature analysis part that analyzes features of the contents being recorded based on the feature quantities; and
a relevance determination part that determines relevance of features of the contents analyzed by the feature analysis part to the designation information.

8. The information processing apparatus according to claim 7, wherein
the feature extraction part extracts at least one of images, sound, and subtitle information in the contents being recorded as the feature quantities.

9. The information processing apparatus according to claim 7, wherein
the feature analysis part analyzes only the contents that match the second search condition.

10. The information processing apparatus according to claim 7, wherein
the feature analysis part terminates an analysis if relevance of features of the contents to the designation information is not found by the relevance determination part within a predetermined time.

11. The information processing apparatus according to claim 7, further comprising
a content storage part that stores the contents; and
a recording part that records the contents in the content storage part, wherein
the recording part
records the contents in the content storage part based on the recording setting information and
deletes the contents from the content storage part if the relevance determination part determines that features of the contents are not relevant to the designation information.

12. An information processing method, comprising the steps of:
receiving contents;
inputting designation information to select desired contents from a user;
generating recording setting information of contents to be recorded based on the designation information;
analyzing relevance of content of the contents being recorded to be recorded based on the recording setting information to the designation information; and
acquiring the desired contents of the user from the recorded contents based on an analysis result,
wherein a determination is made as to whether or not the designation information designates a genre, and when the designation information designates a genre, the analyzing step comprises analyzing image/sound feature qualities of the contents being recorded, and wherein a determination is made as to whether or not the designation information is a keyword, and when the designation information is a keyword, the analyzing step comprises detecting the frequency with which the keyword appears in the subtitle of the contents being recorded.

13. A non-transitory computer-readable medium having stored thereon a computer-readable program, the program causing a computer to function, comprising:
means for receiving contents;
means for inputting designation information to select desired contents from a user;
means for generating recording setting information of contents to be recorded based on the designation information;
means for analyzing relevance of content of the contents being recorded to be recorded based on the recording setting information to the designation information; and
means for acquiring the desired contents of the user from the recorded contents based on an analysis result by the analysis means,
wherein a determination is made as to whether or not the designation information designates a genre, and when the designation information designates a genre, analyzing comprises analyzing image/sound feature qualities of the contents being recorded, and wherein a determination is made as to whether or not the designation information is a keyword, and when the designation information is a keyword, analyzing comprises detecting the frequency with which the keyword appears in the subtitle of the contents being recorded.

* * * * *